H. L. HARTENSTEIN.
METHOD OF PRODUCING METALLIC PRODUCTS FROM IRON ORE.
APPLICATION FILED MAR. 9, 1907.
1,050,735.
Patented Jan. 14, 1913.
2 SHEETS—SHEET 1.
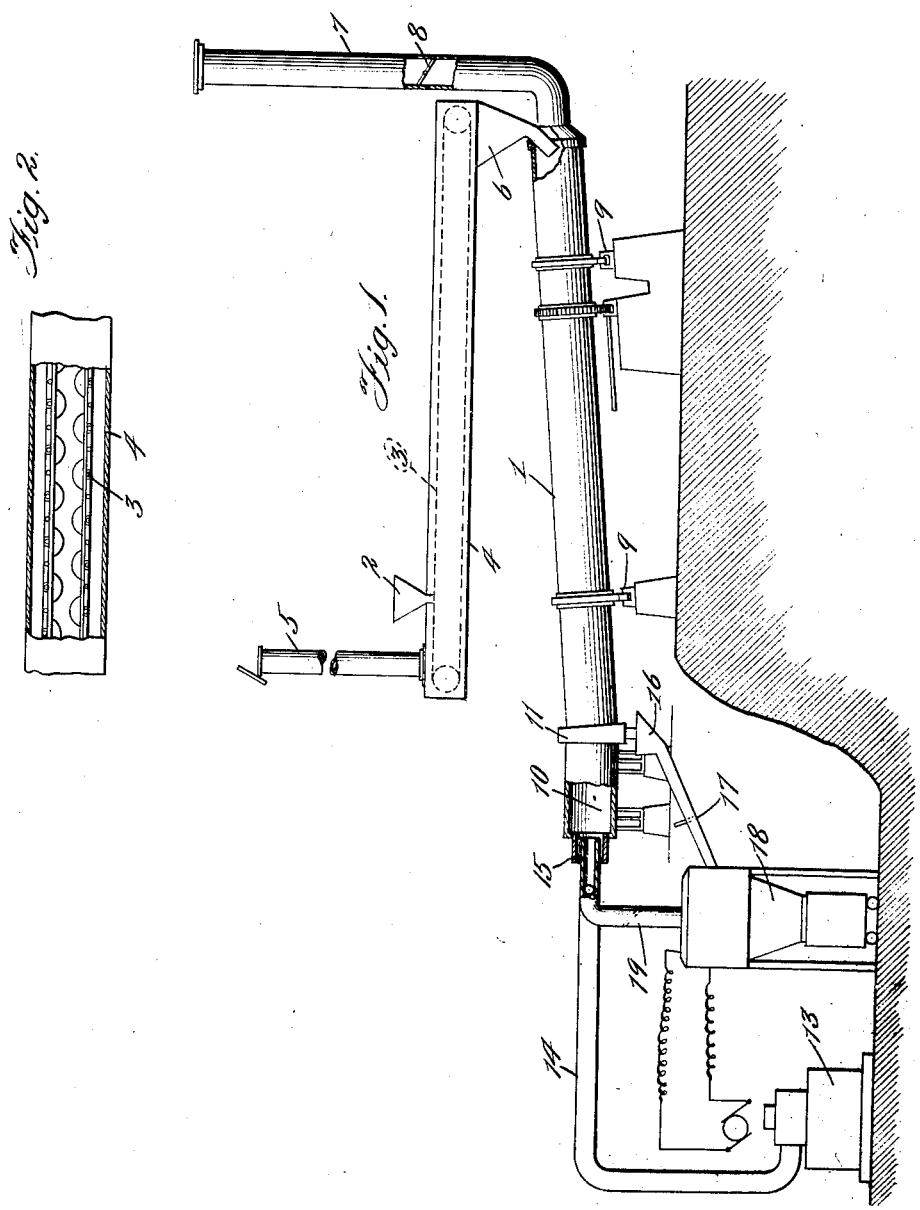

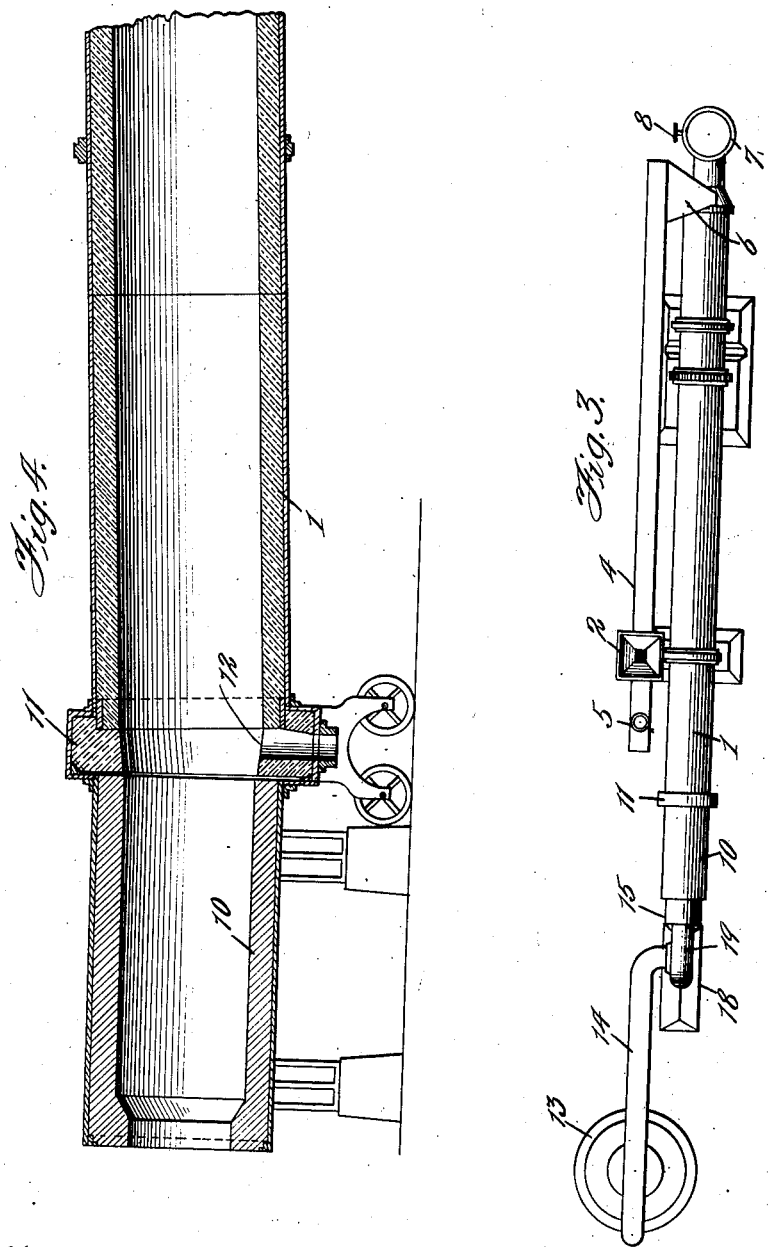

UNITED STATES PATENT OFFICE.

HERMAN L. HARTENSTEIN, OF CONSTANTINE, MICHIGAN, ASSIGNOR TO ELECTRO-CHEMICAL & DEVELOPMENT CO., OF PIERRE, SOUTH DAKOTA, A CORPORATION OF SOUTH DAKOTA.

METHOD OF PRODUCING METALLIC PRODUCTS FROM IRON ORE.

1,050,735.      Specification of Letters Patent.      Patented Jan. 14, 1913.

Application filed March 9, 1907. Serial No. 361,504.

*To all whom it may concern:*

Be it known that I, HERMAN L. HARTENSTEIN, a citizen of the United States, residing at Constantine, in the county of St. Joseph and State of Michigan, have invented certain new and useful Improvements in the Method of Producing Metallic Products from Iron Ore, of which the following is a full, clear, and exact specification.

This invention relates to the method of reducing iron ore to its metallic state or producing therefrom the various alloys constituting the different forms of steel, and has more especial reference to effecting the ultimate reduction of the ore by the heat of the electric furnace, and the improvements are directed mainly to economizing the fuel or heat required to that end.

The reduction of iron ore by the electric current has heretofore been proposed, but as previously employed it has been found unsuccessful owing to the excessive cost of the current necessary to have at hand in order to perform the process on a commercial basis. It is well known that the charge of ore and carbon or carbonaceous material when cold requires the maximum current to produce a reducing degree of heat, and when the charge becomes molten only the minimum current is required. It is also well known that in reducing iron ore to its metallic state the oxygen of the iron ore combines with the carbon of the carbonaceous material used in the process and produces carbon monoxid gas (CO), which is high in heat units. When the reducing process is performed in the blast furnace this gas is consumed and wasted when uniting with the air blast introduced into the furnace and which air blast not only destroys the carbon monoxid, but burns up that portion of the carbon which was in excess of the amount taken up by the oxygen of the iron ore, and furthermore often even reoxidizes a portion of the reduced charge, making it uncertain as to the amount of carbon left in the charge or required to be added thereto to produce steel of a given quality or degree of carbon. This air blast also blows from the furnace the fine ore known as flue dust, which is rich in iron and which has heretofore been regarded as a waste product owing to the inability of manufacturers to keep it in the furnace. The cost of converting this waste dust into a form suitable for use by briqueting, etc., is almost if not quite equal to the value of the dust and therefore is not feasible and in any event it is sufficient to make it a desideratum in the cost of the finished product. The use of the strong blast in blast furnaces also precludes the use of a large percentage of the coke, which occurs in a very fine state of subdivision, but which is sufficiently rich in carbon to be adequate for the purposes of the reducing process.

This invention, therefore, has for one of its objects to avoid the necessity of having at hand the amount of electric current necessary for reducing the charge from the cold state.

Another object of the invention is to preserve the carbon monoxid gas produced in the reducing process and utilize it for preheating the charge preparatory to its introduction into the electric furnace and at the same time utilize the carbon of such gas for liberating a portion of the oxygen of the iron ore in the preheating process, whereby the amount of carbonaceous material required in the final reduction will be considerably lessened.

A further object of the invention is to provide an improved method whereby the hitherto waste portion of the iron ore known as flue dust, which is ejected by the air blast from blast furnaces, may be utilized in the production of a superior grade of iron or steel.

In carrying out the invention, the flue dust or iron ore if not already in a state of fine subdivision is crushed and is mixed with a proper proportion of suitable carbonaceous material, such for example, as coal dust, preferably anthracite coal dust or coal slack of that nature, or coke dust. In practice, approximately 250 to 350 pounds of this carbonaceous material per ton of the ore or flue dust may be employed. These ingredients are thoroughly mixed or commingled, and are then subjected to a sufficient degree of heat to effect a partial reduction, which results in a spongy product or product that might be called iron sponge. These ingredients being in a state of fine subdivision while undergoing this preheating operation, must of course be kept in agitation otherwise the heat would not penetrate the mass and only that on the exterior would be affected, and it is also understood that the powerful air blast heretofore employed in blast furnaces could not be used as the fine material would be carried off with the blast and wasted. It is therefore desirable in performing this step of the process to employ a preheating furnace in which the ingredients or materials are constantly agitated in the presence of the heat and are continuously and automatically discharged from the preheating furnace while the same is in operation, and also from the hottest zone of the furnace in order that the charge may be subsequently introduced into the electric furnace at a high temperature so that the final reduction may be effected with the minimum amount of current. As an apparatus best suited for these ends I employ a rotary preheating furnace having an automatic discharge situated at the point of perfect combustion or zone of highest temperature and from which discharge the material or product passes directly or substantially directly into the electric furnace without any substantial loss of the heat acquired in the preheating furnace. In the electric furnace the operation of final reduction is performed excluded from atmospheric air, and as a consequence none of the carbon monoxid generated therein is consumed or wasted, but may be conducted directly back to the preheating furnace and there admixed with sufficient air to support combustion and utilized in the preheating of the ore and carbonaceous material.

With the foregoing ends in view, the invention consists in the features of novelty which will first be fully described and will then be more particularly pointed out in the claim, reference being had to the accompanying drawings showing an example of a suitable apparatus for carrying the invention into effect, and in which drawings—

Figure 1 is a diagrammatic side elevation of the apparatus; Fig. 2 is an enlarged central sectional view of a portion of a conveyer; Fig. 3 is a diagrammatic plan view of the apparatus; and Fig. 4 is an enlarged vertical longitudinal sectional view of a portion of the preheating furnace.

The fine ore and carbonaceous material, if desired, may be given a preliminary heating by the heat or waste products of combustion rising from the upper end of the preheating furnace, which comprises as one of its elements a rotary inclined cylinder 1. The material is introduced into a hopper 2, directly over an endless conveyer 3, arranged in a horizontal flue 4, as shown in Fig. 2 having an up-take or stack 5 at one end and a discharge flue 6 at its other end communicating with the upper end of the cylinder 1, the flue 6 serving at once for the introduction of the material and the escape of the heat from the cylinder 1 through the flue 4, thereby giving the material on the conveyer 3 a preliminary heating before reaching the cylinder 1. The cylinder 1 may, if desired, be also provided with a stack 7, having a damper or valve 8, so that the heat or products of combustion may be shunted from the flue 4 in greater part and allowed to discharge into the atmosphere. At the lower end of the cylinder 1, which is supported in suitable bearings 9, and provided with any suitable rotating mechanism, is arranged a combustion chamber or hearth 10, and between the contiguous ends of the chamber 10 and cylinder 1 is situated a housing 11, having a discharge aperture 12 in its bottom for the iron sponge or material heated in the cylinder 1. Where the carbonaceous material is heated in cylinder 1 before reaching the electric furnace and consequently is deprived of some of its carbon, leaving it uncertain as to the sufficiency of the amount remaining for preheating purposes in the cylinder 1, it is desirable to provide the preheating furnace with an additional fuel supply such as a producer gas apparatus 13 of the usual or any suitable form having flue connection 14 with the inlet end of the combustion chamber 10, and this may also be utilized of course for supplying the initial heat to the first charge when starting the apparatus and before any carbon monoxid has been generated.

The discharge 12 of the preheating furnace is situated at the hottest zone of the furnace or point where perfect combustion occurs, the air being introduced at 15, and through the discharge opening the product falls directly into a receiving bin or hopper 16, having, if desired, a controlling gate 17, and from here it is allowed to discharge directly into the electric furnace 18, which is completely closed against the admission of external atmosphere, the gate 17 being useful in keeping the connection between the bin 16 and furnace closed and in preventing the material from discharging into the furnace prematurely. From the top of the electric furnace rises a flue 19, which communicates directly with the gas inlet flue 14 and passes the carbon monoxid of the electric furnace into the combustion chamber 10 along with the air through the inlet 15 and any addition of other fuel gas that may be requisite to produce the necessary heat in the preheating furnace.

In the electric furnace the final reduction of the metal and the production of any of the various grades or characters of steel or alloys is otherwise carried out according to the usual or any suitable process, that is to say the iron sponge which is produced in the preheating furnace is utilized in the electric furnace in conjunction with any ores, metals or materials, as the necessities of the case may require. Heretofore in the manufacture of steel the various alloys of iron,— as for instance, ferro chrome, ferro silicon, spiegeleisen, ferro manganese,—are re-heated and combined with the iron after the same has been brought to a molten condition. According to this invention, however, steel or these iron alloys may be more directly and economically effected by mixing any of the natural ores or compounds from which such alloys have been heretofore produced, as for example, silicon, manganese chromium, tungsten, aluminum, copper, nickel, cobalt, molybdenum, vanadium, platinum, titanium, rhodium, iridium, osmium, or palladium, with the iron ore flue dust and carbonaceous material before the same are introduced into the preheating furnace, and when this is done the iron oxid in conjunction with the resultant gases has a reducing influence upon these ores and compounds which are to be alloyed with the iron for steel making. It is also obvious, of course, that by accurate analysis of the constituent iron or carbonaceous material used in the process any special grade or quality of steel may be produced.

When proceeding according to this invention the ore when reduced to a metallic or spongy condition in the preheating furnace being discharged therefrom at the hottest zone of the preheating furnace, enters the electric furnace at a very high degree of heat, and as a consequence the electric energy required to effect the final reduction is much less than heretofore required; the carbonaceous material, which may be coal, coke, charcoal, peat, or other suitable carbon bearing material, being heated in the electric furnace out of contact with air, all of its evolved gas may be utilized in the preheating furnace and the quantity of the carbonaceous material employed may be approximately 25 per cent. of the amount heretofore used in blast furnaces, because it is not wasted or consumed by combustion in the final reduction process; it is not necessary to carry in the preheating furnace the very high temperature essential in a blast furnace because in the preheating furnace no flux is essential although a small quantity might be employed if desired, as the reducing action of the solid and gaseous carbon acts on the iron oxids much below a red heat, resulting in the iron sponge; and the work imposed upon the electrodes of the electric furnace in the final reduction of the charge is greatly diminished by the fact that the oxygen of the ore has been expelled from the charge and as a consequence there is less tendency to oxidation of the electrodes.

Having thus described my invention, what I claim as new therein and desire to secure by Letters Patent, is:

The process of reducing iron ore which consists in passing the ore through a heating chamber from the coolest toward the hottest portion thereof, in introducing a supply of carbon monoxid from an outside source together with air into said chamber, in discharging the partially reduced ore from the hottest portion of said chamber into a second chamber separate and distinct from the first chamber, in reducing the remainder of the oxygen from the ore by an electric current without the access of air, and finally in conveying the carbon monoxid generated in said second chamber into the first said chamber to aid in the partial reduction of a following charge of ore.

In testimony whereof I have signed my name to this specification, in the presence of two subscribing witnesses, on this 28th day of February, A. D. 1907.

HERMAN L. HARTENSTEIN.

Witnesses:
NELLIE ORTON,
DAN. G. CASH.